United States Patent [19]

Klett et al.

[11] Patent Number: 4,806,620

[45] Date of Patent: Feb. 21, 1989

[54] POLYMERIC COMPOSITIONS HAVING FLAME RETARDANT PROPERTIES

[75] Inventors: Michael W. Klett; Balbhadra Das, both of Allison Park, Pa.

[73] Assignee: PPG Industries, Inc., Pittsburgh, Pa.

[21] Appl. No.: 31,631

[22] Filed: Mar. 30, 1987

[51] Int. Cl.⁴ .................................................. C08G 79/02

[52] U.S. Cl. .................... 528/244; 528/259; 524/115; 524/122; 524/123; 524/154; 525/509; 525/515; 525/517; 525/538; 252/609; 252/611; 106/18.15; 106/18.17; 106/18.18; 106/18.19; 106/18.25; 568/8; 568/9

[58] Field of Search ............... 528/244, 259; 524/115, 524/122, 123, 154; 525/509, 515, 517, 538; 252/609, 611; 106/18.15, 18.17, 18.18, 18.19, 18.25; 568/8, 9

[56] References Cited

U.S. PATENT DOCUMENTS

| | | | |
|---|---|---|---|
| 2,772,188 | 11/1956 | Reeves et al. | 117/136 |
| 2,809,941 | 10/1957 | Reeves et al. | 260/2 |
| 2,812,311 | 11/1957 | Reeves et al. | 260/2 |
| 2,983,623 | 5/1961 | Coates | 117/62 |
| 3,122,581 | 2/1964 | Pike | 260/148.8 |
| 3,546,179 | 12/1970 | Koller | 260/75 |
| 3,669,725 | 6/1972 | Nachbur et al. | 117/136 |
| 3,765,837 | 10/1973 | Aycock et al. | 8/115.7 |
| 3,869,340 | 3/1975 | Kotzsch et al. | 161/182 |
| 3,874,911 | 4/1975 | Nachbur et al. | 117/136 |
| 3,878,245 | 4/1975 | Nachbur et al. | 260/553 R |
| 3,883,462 | 5/1975 | Pearson | 260/29.4 R |
| 3,907,898 | 9/1975 | Nachbur et al. | 260/606.5 P |
| 3,931,310 | 1/1976 | Nachbur et al. | 260/551 P |
| 3,932,502 | 1/1976 | Nachbur et al. | 260/553 B |
| 3,936,585 | 2/1976 | LeBlanc et al. | 428/921 |
| 3,956,243 | 5/1976 | Loss et al. | 260/67.6 R |
| 3,961,110 | 6/1976 | Daigle et al. | 427/390 |
| 3,983,269 | 9/1976 | Pearson | 427/370 |
| 3,984,367 | 9/1974 | Pearson | 260/29.4 R |
| 4,020,262 | 4/1977 | LeBlanc et al. | 428/276 |
| 4,066,391 | 1/1978 | Weyker et al. | 8/116 |
| 4,088,620 | 5/1978 | Nihongi et al. | 260/29.4 UA |
| 4,097,560 | 6/1978 | Littman et al. | 260/931 |
| 4,119,598 | 10/1978 | Pearson | 260/29.4 R |
| 4,136,037 | 1/1979 | LeBlanc et al. | 252/8.1 |
| 4,146,585 | 3/1979 | Ward et al. | 260/827 |
| 4,148,602 | 4/1979 | LeBlanc et al. | 8/115.7 |
| 4,166,897 | 9/1979 | Umetani et al. | 528/398 |
| 4,215,172 | 7/1980 | Pearson | 428/264 |
| 4,265,945 | 5/1981 | Frank | 427/353 |
| 4,277,538 | 7/1981 | Beckmann et al. | 428/429 |
| 4,370,422 | 1/1983 | Pearson | 524/598 |
| 4,419,401 | 12/1983 | Pearson | 428/262 |
| 4,427,745 | 1/1984 | Pearson | 428/524 |
| 4,468,495 | 8/1984 | Pearson | 525/158 |
| 4,532,176 | 7/1985 | Briggs et al. | 428/288 |

FOREIGN PATENT DOCUMENTS 418458 3/1974 U.S.S.R.
1179242 1/1970 United Kingdom .

OTHER PUBLICATIONS

"Silicon Compounds Register and Review", Petrarch Systems, Inc., p. 118.

Abstract of article "The Nature of Surface States on Chemically Modified Titanium Dioxide Electrodes", Journal of Electrochemical Society 127(7), 1518-25, Micha Tomkiewicz.

Abstract of article "Reaction of 1-Vinylsilatranes with Organophosphorus Compounds Containing a Phosphorus-Hydrogen Bond", Journal Zh. Obshch. Khim., 49(7), 1525-8 (M. G. Voronkov et al).

Abstract of article "[.beta.-Dialkoxyphosphinyl)ethyl]-Triethoxysilane", from German Offen. DE 2219983, Nov. 8, 1973.

Abstract of article "IR Spectra and Dipole Moments of Some Silyl Derivatives of Diethylphosphonates", Journal Zh. Obshch. Khim, 48(10), 2380-1.

Primary Examiner—Maurice J. Welsh
Assistant Examiner—S. A. Acquah
Attorney, Agent, or Firm—Kenneth J. Stachel

[57] ABSTRACT

An aqueous, resinous solution of a curable, polymeric reaction product, the cured polymeric flame resistant coating and methods for producing them are provided. The solution is formed by direct reaction or prepolymer reaction and chain extension reaction of a methylol and/or hydroxyl-containing quaternary phosphonium compound, divalent nitrogen-containing compound and a heteroatom-containing compound. A nitrogen-containing compound has at least 2 active hydrogen and/or methylol radicals. The direct or prepolymer reaction has present a tertiary amine.

19 Claims, 4 Drawing Sheets

POLYMERIC COMPOSITIONS HAVING FLAME RETARDANT PROPERTIES

The present invention is directed to an aqueous dispersible, curable polymeric compositions and cured thermoset coatings therefrom having phosphorus in the backbone of the polymeric chain and having heteroatoms pendant from the backbone of the polymer. These materials provide improved thermal or fire retardant properties to a variety of substrates.

A variety of flame retardant coatings have been developed utilizing the flame retardant properties of phosphorus with organic polymers like formaldehyde condensates. These materials include: crosslinked condensates of tetrakishydroxymethylphosphonium compounds; homopolymers of tetrakishydroxymethylphosphonium compounds; and formaldehyde condensates with urea, melamine or phenol having phosphoric acid. The direction in the course of developing these materials involved a nonlinear correlation between increasing the amount of phosphorus in the polymeric material and a decreasing improvement in flame retardancy of the material. Additional desired properties such as flame retardant durability, hydrolytic stability (water resistance), aging stability, depend upon the structure of the organic polymer. For instance, it was discovered that the hydrolytic stability of phosphorus-containing polymers is achieved when the polymer has P—C bonds as opposed to P—N—C bonds or P—O—C bonds. On the other hand, the preparation of the P—C bonds in the organic polymers is relatively difficult and more costly than synthesis of the other types of bonds in the organic polymers. Likewise, increasing the flame retardant properties of the polymer by increasing the amount of phosphorus via use of homopolymers of phosphorus-containing monomers can involve more tortuous formation conditions at greater expense. The art needs the ability to increase in the amount of phosphorus or fire retardant material on a substrate without sacrificing a good balancing of the properties attributable to any organic polymer used in connection with the phosphorus. Also a phosphorus-containing organic polymer should have a fascile manner of production without being too costly.

Recent concerns affecting the continued development of certain types of flame retardants are toxicological issues and specificity of application for particulate substrates. Recent increased awareness of adverse health effects of free formaldehyde has created an impetus to eliminate or to reduce below set limits of free formaldehyde in resinous products. Also the growing variety of geometric shapes of substrates and number of compositions of substrates requiring fire retardant coatings has affected the suitability of a particular fire retardant coating for a particular substrate. For instance, a veritable explosion of the number of electronic devices utilized in the workplace and homes, for instance, personal computers, computer terminals, video recording devices as well as the number of television sets has increased the need for flame retardant housing and support materials. Backboards for television sets made from pulped wood fibers are required to be flame retardant. The geometry and dimensions of such backboards and housing and support components of electronic devices require that flame retardant coatings have a fair degree of flexibility to avoid cracking of the coating with resultant loss of fire retardant protection. For instance, the television backboards are formed by heat and pressure treatment of pulped wood fibers collected on a screen in a process similar to papermaking. These backboards are generally ⅜" thick without flame retardant coating they burn quite rapidly. With increasing cathode ray screen size to 25 inches and more for televisions, the backings are becoming longer and wider; therefore, they require the necessary degree of flexibility. Flexibility of the substrate requires good flexibility of the flame retardant coating to avoid cracking of the coating with a resultant loss of flame retardant protection.

An object of the present invention is to produce a curable phosphorus-containing polymer and cured coating therefrom having an increased phosphorus content resulting in good flame retardancy without sacrificing properties dependent from the organic polymer and having reduced contents of free formaldehyde and having good flexibility.

SUMMARY OF THE INVENTION

The present invention involves the formation of a curable polymeric reaction product by reacting heteroatom-containing acid or salt; hydroxyl-containing, quaternary phosphonium compound and divalent nitrogen-containing compound. The order of addition of these reactants is approximately simultaneously or sequentially to form a prepolymer with subsequent addition of the heteroatom-containing acid or salt. The heteroatom-containing acid or salt is one like phosphoric acid or its derivatives, diammonium hydrogen phosphate, boric acid, hydrogen bromide and the like. The hydroxyl-containing quaternary phosphonium compound is like tetrakishydroxymethylphosphonium with anions like sulfate chloride and the like. The divalent nitrogen-containing compound has at least two active hydrogens and/or methylol radicals attached to a trivalent nitrogen. The mole ratio reactants whether the reaction is by the simultaneous or the prepolymer mode of reaction is generally in the range of: around 1 for the quaternary phosphonium compound, around 1.5 to around 5 or more for the nitrogen-containing compound to leave some reactive sites for curing reactions, and around 0.5 to around 4 for the heteroatom-containing acid or salt. The reaction is conducted at an effective pH, temperature and residence time to favor the formation of a methylene bridge linkages between the reactants.

The pH of the prepolymer reaction of the quaternary phosphonium salt and urea-containing compound is effective to avoid the formation of free formaldehyde that would react as a crosslinker and result in gellation. The viscosity of the prepolymer solution should not exceed around 39–70 centipoise. When the prepolymer solution is reacted further with the heteroatom acid or salt, the curable polymeric reaction product generally is formed in an aqueous medium or by any other method known to those skilled in the art such as formation of powders. In the aqueous solution, the solids content of the curable reaction product can range up to around 95 weight percent. Also the condensate prepolymer generally is formed in an aqueous medium or in any other medium known to those skilled in the art. For curing the aqueous solution of the curable polymeric reaction product, a sufficient quantity of the nitrogen-containing compound or other suitable crosslinking material is added to give an overall molar ratio of the nitrogen-containing compound to the methylol-containing quaternary phosphonium compound in the range of about 1:1.5 to less than 5.

In addition to the aforementioned reactants aldehyde compounds such as acetaldehyde, trioxane, hexamethylene, tetramine, furfurol, benzaldehyde and the like can be present initially or to form the polymeric reaction product.

In addition, the aqueous solution of the curable polymeric reaction product can be combined with various components known to those skilled in the art to form intumescent coatings and can include adhesion promoters like melamine formaldehyde resins and the like and various forms of inorganic fillers. The aqueous solutions of the curable polymeric reaction product with or without additional components can be applied to a variety of substrates such as: cellulosic solids, fibers and textile fibers and mats, glass solids, fibers, textiles, fabrics and mats, and other synthetic and natural fibers, textiles, fabrics and mats. Once the substrate is coated with the aqueous solution of curable polymeric reaction product, the substrate or coating is treated to drive off water and promote the crosslinking reaction between the crosslinking agent and the curable reaction product. Suitable conditions include heating at a temperature in the range of about 50° C. to 150° C. for a period of time in the range of about 0.15 to 2 hours or any equivalent temperature and time relationship that cures the coating which is also dependent on the type and amount of curing or crosslinking agent.

DETAILED DESCRIPTION OF THE INVENTION AND PREFERRED EMBODIMENT

To make the cured, thermoset flame retardant coating and aqueous dispersion of the curable reaction product of the present invention, the reactants are added together in a one-step reaction or a condensate prepolymer is formed and further reacted in a two-step reaction.

The methylol-containing quaternary phosphonium reactant used in the present invention generally is like the tetrakishydroxyalkyl phosphonium salts having the formula:

$$HO-(CH_2)_m-P-(CH_2)_m-OHX^-$$
with $(CH_2)_m OH$ groups (Formula 1)

where $m$ is an integer from 1 to 3 but preferably 1. Nonexclusive examples of suitable quaternary phosphonium compounds include: tetrakis-(hydroxymethyl)-phosphonium (THP) salts where the salt is formate, acetate, phosphate, sulfate and halides, such as, for example, bromide and chloride. Also tetrakis-(hydroxymethyl)-phosphonium hydroxide (THPOH) can be used. Generally, the tetrakis-(hydroxymethyl)-phosphonium chloride (THPCl) is prepared by the reaction of $PH_3$ with formaldehyde and hydrochloric acid. It is not necessary to convert any of the THP salts to the THPOH, and it is preferable to avoid subjecting the THP salts to neutral carbonates like calcium carbonate, alkali carbonates like sodium carbonate and alkali metal hydroxides and strong bases in general to avoid conversion of the salt to the trishydroxy methyl phosphine oxide. The hydroxy methyl groups of the phosphine oxide compound are less reactive than the hydroxyl methyl groups on the phosphonium salts in condensation reactions. In addition, the presence of the phosphine oxide group would limit sites on the prepolymer backbone for crosslinking or for further addition of heteroatom-containing acids. Generally, the THP salts are present in aqueous solution and suitable commercial solutions include: Retardol S available from Albright and Wilson Inc., 180 Old Tappan Road, Old Tappan, N.J. 07675 and Pyroset TKOW from American Cyanamide, Wayne, N.J.

The divalent nitrogen-containing monomer having at least two active hydrogens includes such materials as urea and urea derivatives like methylol ureas, alkylated methylol ureas, oxalyl urea and hydantoin; melamine and melamine derivatives like methylol melamines; alkylated methylol melamines, alkylated substituted melamines, where the alkyl group or groups are either unsaturated or saturated; cyanamide and dicyanadiamide and aliphatic diamines and polyimines such as ethylene diamine and polyethyleneimine, urea formaldehyde and melamine formaldehyde condensates and cyanamide, acrylamide, alkyl thioureas or aryl thioureas, propylene urea, acetylene diurea and compounds having at least one active hydrogen and at least one methylol group such as those having a formula:

Formula 2 where Y is hydrogen, alkyl, aryl, acyl, alkoxyl, aryloxy and the like and where R denotes hydrogen, alkyl and aryl radicals, and where Z is a hydrogen, alkyl, aryl or acryl radical, and alkoxy groups having 1 to 4 carbon atoms, hydroxy alkoxy groups with 2 to 4 carbon atoms and amino carbonyl groups and the like.

The heteroatom-containing acid or salt is useful as a reactant in a direct forming reaction or a prepolymer two step reaction in forming the polymeric reaction product of the present invention. Nonexclusive examples of suitable acids include: phosphoric acid, boric acid, hydrogen bromide and the like. By the term "phosphoric acid", it is meant to include all of the oxy acids of phosphorus such as hypophosphoric, ($H_3PO_2$), phosphoric ($H_3PO_4$), phosphorus ($H_3PO_3$) pyrophosphoric ($H_4P_2O_7$), metaphosphoric ($H_3PO_3$)$_3$, polyphosphoric, and any of these as esterified acids of acid salts provided at least one free acidic functionality is present. Other useful compounds include: phosphonic acid, phosphinic acid and mixtures thereof (e.g., where R=hydrogen, alkyl or aryl.

In the prepolymer reaction approach, the quaternary phosphonium compound and divalent nitrogen-containing compound are reacted to produce a prepolymer condensate. This condensate may have branching, but is not a three-dimensional cage-like structure, and the prepolymer has more reacted divalent nitrogen-containing compound than that which would be used for merely crosslinking an abundance of the phosphonium compound. Larger amounts of certain nitrogen-containing compound per the amount of phosphorus can actually enhance flame retardant properties. The molar ratio of the two monomers for the condensation reaction is in the range of 1.5:1 to about 5:1 of the nitrogen containing monomer to the phosphonium compound monomer. The condensation reaction is conducted preferably in an aqueous medium although the reaction can be conducted in the presence of inert organic solvents such as aromatic hydrocarbons or organic solvents forming azeotropes with water or alcohols, ethers, (e.g., dioxane), dimethylsulfoxide, dimethylformamide, and dimethylmethyl phosphonate. An effective pH is maintained in the condensation reaction to avoid formation of free formaldehyde. This effective pH control allows for the production of methylene bridges between the carbon of the phosphonium compound and the nitrogen containing compound. Preferably the pH is controlled within the range of about 5 to about 7. Effective pH control is provided by the presence of an effective amount of a tertiary amine like trialkanol amines, for example, triethanolamine, diethanolamine, ethanolamine, and triethyl amine or alkanol amines and alkanyl amines, such as ethanol amine, dimethyl amino ethanol, diethyl amino ethanol, diisopropanol amine, triisopropanolamine, 4-hydroxy-n-butyl amine, 2-dimethyl amino, 2-methyl propanol and the like having a formula $R_2'N-CH_2-CH_2-OH$ wherein 1 R' is methyl or ethyl and the other independently is ethyl or 2 hydroxyl ethyl. In the order of decreasing preference, those specific alkanolamines which are more highly preferred are triethanolamine, diethanolamine, ethanolamine, N-methyl ethanolamine and N-N-dimethyl ethanolamine and the like. Also the temperature and reaction time of the condensation reaction are controlled to prevent the production of insoluble gels or of side reactions or of conflicting reactions. For instance, if the temperature is too high, an insoluble gel results. It is preferred to have a temperature of ambient temperature and possibly as high as 80° C., but preferably the temperature is no higher than up to about 40° C. The time of the reaction depends upon the temperature of the reaction and can range from several days for ambient temperature reactions to around 10 minutes for higher temperature reactions. Because the reaction is limited to control the formation of methylene bridges between the monomers and to avoid abstraction of hydrogen to keep intact as many hydroxy groups as possible, the water of the condensation reaction need not be removed. The reaction is conducted for a period of time to produce a prepolymer which is water soluble so the viscosity does not extend too much beyond 70 to 100 centipoise at reaction conditions. The viscosity of the material can be determined by any method known to those skilled in the art. Alternatively, the viscosity need not be measured if a carefully controlled heating is conducted of the THP salt and divalent nitrogen-containing compound, since this results in an adequate viscosity, and generally the weight average molecular weight $\overline{M_w}$ of the prepolymer is in the range of around 466 to around that which results in the first formation of a precipitate which when quenched with the heteroatom-containing compound like phosphoric acid is resolubilized. Preferably, the $\overline{M_w}$ is up to around 1334 based on the sulfate salt of the phosphonium compound. Preferably, there is present during the condensation reaction an ammonium salt catalyst such as diammonium phosphate, ammonium chloride, ammonium carbonate and ammonium hydroxide. Other suitable catalysts include organic amines, amides, and imines such as pyridine, acrylamide and polyethyleneimine. The function of the catalyst is to accelerate the condensation reaction in a controlled manner, but the catalyst may also react with the phosphonium salt.

Although the present invention is not limited by any particular theory, we believe that the prepolymer reaction route involves the production of an oligomer or resinous condensate having a repeating unit such as:

Formula 3 where x is an integer from 1 to about 3 to give the number average molecular weight in the range of about 466 to 1334 gm/mole. The prepolymer condensate is branched but not highly branched and it is essentially free of free formaldehyde and it has phosphorus in the backbone of the polymer in a linkage of a P—C—N type.

Additional components can be present with the two types of monomers in the condensation reaction. Non-exclusive examples include acetaldehyde, trioxane, hexamethylene tetramine, formaldehyde, furfuraldehyde and benzylaldehyde. When acetaldehyde is present it can be present in an amount up to around 1 mole. It is believed that the repeating unit for a prepolymer condensate having acetaldehyde would be:

After the preparation of the prepolymer condensate having numerous reactable hydroxyl groups, the heteroatom acid or salt is added. This addition to the aqueous solution of the prepolymer condensate results in the production of the aqueous soluble, curable polymeric reaction product of the present invention. The acid or salt could be incorporated in the side chains, or through chain extension reaction, it could condense onto the polymer backbone. Either way, the predominant reaction is at the internal and external hydroxyl sites of the prepolymer. The addition of the heteroatom-containing flame retardant acid or salt to the aqueous dispersion of prepolymer condensate, which usually has a total solids in the range of up to about 95 weight percent, is performed to terminate the base catalyzed condensation reaction and to stabilize the intermediate oligomers such that the polymeric reaction product is soluble in water and is curable. One method of stabilizing the polymeric reaction product is by selection of the molar ratios of the heteroatom acid and prepolymer condensate. The ratio is in the range of about 0.5:1 to less than about 4:1 of the former to the latter.

Once again, although the invention is not limited by any specific theory, we believe that the main reaction of the heteroatom acid and prepolymer condensate is an esterification reaction accelerated by the divalent nitrogen-containing compound. By esterification, we mean that the free hydroxyl groups on the prepolymer or within the resin composition will be transformed into phosphate esters after waste is removed in forming a cured coating. Prior to removal of water, the acid stabilizes the intermediate oligomers, and the presence of urea and urea derivatives maximize the phosphate esterification. As opposed to forming the prepolymer by heating until a viscosity of not more than 80 cps is achieved, the condensation reaction can be and preferably is base catalyzed. In this latter instance, if the base present in the aqueous dispersion of the prepolymer condensate is volatile and dissociates from the acid (preacid or phosphoester of the P—OH groups), this is an additional reason for the base being a tertiary amine. An additional possible reaction of the base neutralization is performed by diluting the basic aqueous solution of prepolymer condensate with the heteroatom-containing acid. A set number of equivalents of acid (2 moles of acid) for example, (for each mole of prepolymer condensate is charged to the reaction. The amount of acid required may be measured out accordingly to a predetermined base content in the material to be neutralized. Alternatively, litmus paper or pH paper or a pH meter may be used to determine when to stop adding acid. Another option which may be satisfactory in routine operation is simply to add the acid in increments with good stirring until the appearance or behavior of the stirring dispersion markedly alters in a way known to correspond to attainment of the desired degree of neutralization. In general, however, a definite pH within the range of from around 0.5 to around 5 will be preselected as the N point for the neutralization. Since the rate of neutralization will drop off as the number of unneutralized acidic hydroxyls present decreases, sufficient time should be allowed after each acid addition to insure that any apparent end point is in fact a true end point. Hence, the reaction occurring upon addition of the acid to the prepolymer is in part transisterification and in other part base neutralization reactions. The resultant resinous reaction product is water thinnable to any desired concentration. The preparation of the prepolymer condensate can be by addition of the reactants in any manner as long as the reaction does not proceed until the tertiary amine base is present to control the pH of the reaction. For instance, when the reaction temperature is ambient temperature, the tetrakis hydroxymethyl phosphonium salt can be dissolved in water along with the urea-containing compound. Afterwards, the tertiary amine can be added since the two reactants do not react at ambient temperatures. Addition of diammonium phosphate accelerates the condensation reaction begins. The aqueous dispersion of the polymeric reaction product has a color tint changing from clear to pinkish and is stable for several months depending on how cool the solution is maintained. After several weeks, the aqueous dispersion of the resinous product can become hazy and insoluble precipitates or gels are formed.

Alternatively or in combination with the prepolymers a reaction route to preparing the aqueous soluble, curable polymeric reaction product involves adding all or part of the heteroatom acid directly in the initial reaction. If all of the acid is added, the reaction route is more direct than through any prepolymer formation, since there is no subsequent addition of the acid. In the direct approach, the aqueous soluble, curable polymeric reaction product may have a different structure from that of the prepolymer reaction route. The final product will depend on relative rates of reaction, but it is believed that the heteroatom acid like phosphorus acid would limit a large portion of the polymeric species to lower molecular weight species. The direct reaction is conducted in the same manner as the prepolymer reaction route except the heteroatom-containing acid is present as a reactant.

The aqueous solution of the curable polymeric reaction product optionally contains various types of fillers and/or extenders. Nonexclusive examples of these include: silicas like hydroded silica, precipitated silica, Hi-Sil® silicas, silicates, clays, titanium dioxide, wallastonite, vermiculite and the like. The amount of these materials which are incorporated into the aqueous solution of curable polymeric reaction product varies somewhat for the different types of materials. Generally, the amounts range from up to 50 weight percent of the coating. Generally, the addition of these materials is performed to prepare a stable, curable, polymeric reaction product with reasonable shelf life.

In addition, surfactants can be added to the aqueous solution of curable polymeric reaction product. This results in better film properties of cured coating on some types of substrates. Also internal surfactants can be incorporated into the curable polymeric reaction product in the prepolymer or direct reaction sequence.

Also, the aqueous solution of curable polymeric final product with curing agent can be formulated into intumescent coatings using components known to those skilled in the art. For instance, an intumescent coating is prepared as an aqueous slurry with melamine formaldehyde silica like Hi-Sil silica, and wallostonite.

After formation of the aqueous dispersion of the polymeric reaction product by either the prepolymer or direct reaction routes, the remaining amount of the nitrogen-containing compound from the deficient amount reacted to produce the prepolymer condensate is added. In addition, any other curing agents such as water dispersible aminoplast and phenoplast resin such as hexamethylol melamine and phenol-formaldehyde, A-stage novalacs can be used. Various substrates can be treated with the aqueous dispersion by any manner known to those skilled in the art such as dipping, brushing, spraying, padding, contacting with rollers and the like.

Generally, the aqueous solution can be applied to the substrates as a primer coating. Also various types of known thixotropic agent can be added at this point to increase the viscosity for supplying the curable polymeric reaction product as a gel. Additionally, any other known means can be employed for supplying the solution to the substrates. The substrates, which can be treated, include hydroxyl-containing substrates like cellulosic materials such as: fiber boards, wood, viscose, cellulose containing textiles, fabrics and mats, and pulp paper products and the like.

Also various types of inorganic oxides are treatable as substrates. The inorganic oxide substrates include: any inorganic solid material which possesses either oxygen (chemisorbed or covalently bonded as in oxide coatings of aluminum and iron or steel) or hydroxyl (bonded or free) as its exposed surface. It also includes any material which can be treated by silane coupling agents known in the prior art. The inorganic oxide material can be any form including particles of irregular or regular (e.g., spherical) shape, individual fibers, woven fiber mats or fabric or continuous surfaces such as sheets, films, slabs and formed surfaces. Specific illustration of suitably employed inorganic oxide materials are, for example, brass with an oxidized surface, copper metal with an oxidized surface, aluminum metal with an oxidized surface, iron or steel with an oxidized surface, alumina, aluminum, trihydrate, siliceous materials such as fumed silica, hydrated silica (precipitated silica), silica aerosols, silica zero gels, aluminum silicates, calcium magnesium silica, asbestos, glass including glass fibers, clays, molecular sieves, wallostonite, carbon black (including lamp black), titanium dioxide including titanium dioxide which contains hydrochloric acid soluble alumina and/or silica, calcium sulfate, magnesium sulfate, vermiculite, mica and the like.

When the flame retardant material of the present invention, i.e., the aqueous soluble, curable polymeric reaction product is applied to nonflammable substrates, the term flame retardant includes performance resulting in increased heat or temperature resistance or stability of such a treated substrate. With direct application of a solution of the curable polymeric reaction product to the surface of the substrate, the affective amount can vary from about 0.1 weight percent to about 10 weight percent based on the weight of the substrate. With application as a primer to a surface of a substrate, the effective amount of the mixture or interaction product can vary from about 0.05 grams per square meter to about 1.5 grams per square meter. The curing of the curable polymeric reaction product applied to the substrate is affected by evaporation of water from the solution and/or by chemical reaction with the curing agent initiated by drying or heating. The evaporation or drying is accomplished by any method known to those skilled in the art.

Generally after the substrates are treated with the aqueous dispersion of the polymeric reaction product with the curing agent, the substrates are dried and the coating is cured generally by heating to a temperature of from about 60° to about 150° C. The drying of the substrate may involve a first drying step in a conventional manner to a fairly low moisture content at a temperature between about 40° and 70° C. Thereafter, the substrate is cured further by heating to a temperature between 60° and 150° C. Curing temperatures greater than 110° C. should not be used on substrates that are cellulosic since adverse affects on the properties of the substrate may develop. However, care must be taken to ensure that sufficient temperatures and times are used properly to cure the coated substrates. The best conditions may be determined readily by one of ordinary skill in the art. The cured coatings on the substrates can have varying thicknesses depending on the amount of the curing agent and other components in the formulation. Generally film thickness are obtainable in the range of about 1 to 10 mils.

PREFERRED EMBODIMENT

Preferably a prepolymer condensate is prepared by reaction of tetrakis (hydroxymethyl) phosphonium sulfate and urea in a molar ratio in the range of 1:1 to 1:1.7 in the presence of a tertiary amine such as triethanolamine. The amount of the tertiary amine is sufficient to give a pH for the reactants in water in the range of about 5 to about 7. After the reactants are dissolved in water and the base is added, a catalyst such as diammonium phosphate is added in sufficient amounts to accelerate the reaction at ambient temperatures. The reaction is conducted for a period of time ranging from about 0.5 hours to 24 hours without the removal of water. After this preparation of the prepolymer, phosphoric acid is added to the aqueous dispersion in an amount to give a molar ratio of the phosphoric acid to the tetrakishydroxymethyl phosphonium sulfate of 1:1 up to about 4:1 respectively. Addition of phosphoric acid results in an exotherm that is controlled to under 100° C. This reaction is conducted for any length of time since the reaction is limited by the addition of a deficient amount of phosphoric acid to produce the curable polymeric reaction product. The resultant aqueous dispersion of reaction products has a nonvolatile solids content in the range of about 75 to about 85 weight percent, a viscosity of U-V on the Gardner-Holt scale.

For curing the polymeric reaction product, the remaining amount of urea is added to provide a stoichiometric amount of urea for the amount of THPS initially reacted to form the prepolymer condensate. This addition is conducted at ambient temperatures and the aqueous dispersion is stable for up to several months. This aqueous dispersion is coated onto substrates, preferably fiber board or glass, and cured at a temperature in the range of 40° C. to less than 110° C. for fiberboard and to around 150° C. for glass. This drives off water and completes the reaction of the urea and the polymeric reaction product. The resultant coating has good flexibility, hydrolytic stability and durability.

Numerous experiments have been performed which demonstrate how to make and how to use and the effectiveness of this invention. The following examples illustrate the invention but should not be construed as limiting the scope of the invention.

EXAMPLE 1

In a prepolymer reaction sequence, tetrakishydroxymethyl phosphonium sulfate as Retardol S THPS in an amount of 3,070 grams (5.67 moles) was combined with urea in an amount of 538 grams (8.97 moles) and stirred until homogeneous. Triethanolamine in an amount of 314 grams (2.14 moles) and diammonium hydrogen phosphate in an amount of 5 grams were added to the mixture with continued stirring for 24 hours to form a prepolymer solution. To this solution, there was added phosphoric acid in an amount of 985 grams (8.54 moles). Stirring was continued until a clear pink solution was obtained.

EXAMPLE 2

In a prepolymer reaction approach, tetrakishydroxymethyl phosphonium sulfate as Retardol S in an amount of 25 grams (0.048 mole) was combined with urea in an amount of 5.76 grams (0.096 mole) then heated to 75°–80° C. for 2 hours after which phosphoric acid in an amount of 10.9 g (0.094 mole) was added. The above composition had a shelf life of 12 days and formed soft nontacky flame retardant films.

EXAMPLE 3

In the direct reaction route, tetrakishydroxymethyl phosphonium sulfate as Retardol S in an amount of 29 grams (0.054 mole) and phosphoric acid in an amount of 15 grams (0.13 mole) was combined with urea in an amount of 15 grams (0.25 mole) with stirring until homogeneous. The above composition had a shelf life of several months and formed hard, brittle and nontacky fire retardant films.

EXAMPLE 4

Tetrakishydroxymethyl phosphonium sulfate as Retardol S in an amount of 50 grams (0.092 mole) was combined with urea in an amount of 8.8 grams (0.15 mole) and stirred until homogenous. Triethanolamine in an amount of 5.1 grams (0.034 moles) and diammonium phosphate in an amount of 0.2 grams (0.0015 moles) was added to the mixture with continued stirring for 24 hours. Afterwhich hot (110° C.) polyphosphoric acid in an amount of 16.5 grams was added, and stirring was continued for 1 hour or until cool.

EXAMPLE 5

A round-bottom flask equipped with a magnetic stir bar was charged with a 50 percent aqueous solution of urea (62 grams), triethanolamine (12 grams), Retardol S THPS (58 grams), and a cold ($-20°$ C.) aqueous solution of acetalaldehyde (40 percent by weight), 72 grams. The flask was quickly capped with a rubber septum to prevent escape of acetalaldehyde and stirred for 0.5 to 1 hours. The flask was vented with a needle and phosphoric acid (30 grams) was added via syringe. The vent needle was removed and the mixture stirred until cool (room temperature).

Additional Examples 6–9 produced in a similar manner to Example 5 with varying amounts of acetaldehyde and other reactants are shown in Table 1.

TABLE 1

| Example | Retardol S | Urea | Trietha-nolamine | Acetalde-hyde | Phosphoric Acid |
|---|---|---|---|---|---|
| 6 | 1.00 | 4.40 | 0.58 | 6.00 | 2.70 |
| 7 | 1.00 | 3.00 | 1.00 | 3.00 | 3.00 |
| 8 | 1.00 | 4.80 | 0.76 | 6.10 | 3.00 |
| 9 | 1.00 | 4.7 | 0.75 | 2.50 | 3.2 |

In the same procedure as in Example 1, the varying mole ratios of materials as shown in Table 2 for Examples 10 and 11 were used to produce the aqueous solution of polymeric reaction product.

TABLE 2

| | Mole Ratios | | | | |
|---|---|---|---|---|---|
| Example | Retardol S | Urea | Trietha-nolamine | Ammonium Phosphate Dibasic | Phosphoric Acid |
| 10 | 1.00 | 1.60 | 0.38 | 0.037 | 0.75 |
| 11 | 1.00 | 1.60 | 0.38 | 0.038 | 3.0 |
| 12 | 1.00 | 1.60 | 0.35 | — | 1.0 |
| 13 | 1.00 | 1.60 | 0.35 | — | 1.25 |
| 14 | 1.00 | 1.80 | 0.38 | — | 1.00 |
| 15 | 1.00 | 2.00 | 0.51 | — | 2.00 |
| 16 | 1.00 | 4.00 | 0.51 | — | 0.50 |

For Example 12, the same procedure was used as Example 2 with stirring for 2 hours before the addition of phosphoric acid. A colorless good film former cured to a clear hard finish but an offensive phosphine-like odor was present. The procedure was repeated with stirring for an 8 to 10 hour period rather than 2 hours and a good film former was produced which cured to a clear hard finish.

EXAMPLE 17

Tetrahydroxymethylphosphonium salt (Pyroset TKOW) in an amount of 125.9 grams (0.232 mole) and urea 22.3 grams (0.372 mole) were combined and stirred under nitrogen purge until solubilized. At this time, triethanolamine in an amount of 13 grams (0.088 mole) was added and stirred for 24 hours. The mixture was quenched with phosphoric acid in an amount of 26.7 grams (0.23 mole). The Gardner viscosity of the prepolymer was around J-K, and in this example, the mole ratio of the phosphoric acid to the THPS was 1:1.

EXAMPLES 18–20

The prepolymer produced in accordance with Example 1 in an amount of 500 grams was partitioned into two 250 gram portions. This left an original amount of the prepolymer for these examples in an amount of 3,927 grams. In Table 3 below, the amount of the prepolymer reacted with an amount of phosphoric acid is shown.

TABLE 3

| | Amount of Prepolymer | Amount of Phosphoric Acid | Ratio THPS/H$_3$PO$_4$ |
|---|---|---|---|
| Example 18 | 3,927 grams | 860 grams | 1.0/1.5 |
| Example 19 | 250 grams | 31.25 grams (0.27 mole) | 1.0/0.75 |
| Example 20 | 250 grams | 125 grams (1.08 mole) | 1.0/3.0 |

The films produced by the polymeric reaction product of Examples 17–19 were adequate films.

EXAMPLE 21

Seven examples of aqueous polymeric reaction product and cured coatings were prepared with varying types and amounts of phosphoric compounds. The amounts, conditions and properties are given in Table 4, where the abbreviation "AP" means ammonium phosphate.

TABLE 4

| | Various Types and Amounts of Heteroatom-Containing Material Added to Prepolymers | | | | | |
|---|---|---|---|---|---|---|
| Example No. | THPS 75% Solids grams/mole | Urea 50% Aq grams/mole | TEA grams/mole | Heteroatom Material Type/amount gram/mole | Reaction Conditions time hour | Property of Film |
| 21-1 | 25/0.046 | 22/0.184 | 3.5 | phenyl phosphoric acid/ 14.5/0.092 | 0.5 | Good film former, clear, colorless, and had poor flame resistance |
| 21-2 | 101/— | 17.6/— | 10 | polyphosphoric acid/13.2 — | 50-60° C. 30 minutes | Colorless film after curing at 120° C. for 15 minutes |
| 21-3 | 100/— | 17.6/— | 10 | polyphosphoric acid/10/— | 2 minutes | Gelled |
| 21-4 | 50/1.26 | 8.8/1 | 5.1/0.235 | (NH$_4$)$_2$ HPO$_4$/0.2/cat. H$_3$PO$_4$/16/0.953 | 24 hours before H$_3$PO$_4$ addition | White precipitate, brittle coating |

TABLE 4-continued

Various Types and Amounts of Heteroatom-Containing Material Added to Prepolymers

| Example No. | THPS 75% Solids grams/mole | Urea 50% Aq grams/mole | TEA grams/mole | Heteroatom Material Type/amount gram/mole | Reaction Conditions time hour | Property of Film |
|---|---|---|---|---|---|---|
| 21-5 | 50/1.26 | 4.4/0.5 | — | $(NH_4)_2 HPO_4[AP]/0.5/9.7$ $H_3PO_4/8.12/0.48$ | THPS + AP 8 hours, add urea | Pink colored solution |
| 21-6 | 50/1.26 | 8.8/1 | 5.5/0.235 | $(NH_4)HPO_4/0.2$ cat. $H_3PO_4/16/1.01$ | — | A brittle coating |
| 21-7 | 50/1.26 | 8.8/1 | 5.1/0.235 | $(NH_4)HPO_4/0.2$ cat. polyphosphoric acid/ 16.5 | Hot 110° C. PAP added | Viscous, slightly yellow gave coating separate from glass |

Water extraction tests were performed on the coatings of the aqueous solution of polymeric reaction product of Examples 1 having various amounts of urea curing agent to determine the percent of water extractables of the resulting coating. The conditions and results of this test are presented in Table 5 for extractions by water in a Soxhlet for 1 hour.

TABLE 5

Water Extraction Tests of Coatings

| Example | Amount of Polymeric Reaction Product (grams) | Amount of Urea Grams/% | Coating Formation Conditions | Coating Characteristics | Leachables 5 days at 50° C. |
|---|---|---|---|---|---|
| 1 | 130 | 1.3/1.5 | Cured for 5 days on Teflon resin | Tacky, viscous syrup | — |
| 2 | 130 | 4/3.0 | Cured for 5 days | Nontacky, same elasticity, rips when pulled | 19.2–23.0 |
| 3 | 130 | 8/6.0 | Cured for 5 days | Very tough film which broke into pieces, a fast cure | 16.0–16.2 |
| 4 | 130 | 6/4.5 | Cured for 5 days | Nontacky after 1 day and becomes tougher on continued curing | 13.3–13.7 |
| 5 | 130 | 10/10 | Cured for 5 days | Cracked, very brittle film | 21.8–24.6 |

Limiting oxygen index tests were performed on the coatings of Example 1 having a 1:1 mole ratio of tetrakishydroxy methyl phosphonium sulfate to phosphoric acid and a variation of Example 1 where the mole ratio was 1.25 and the prepolymer condensate of Example 1. For curing of the coatings, 3% by weight urea was added to the aqueous dispersion of the resinous reaction product produced in accordance with Example 1 except for the different mole ratios. Kraft paper was conditioned at 150° C. for 15 minutes prior to dipping. The kraft paper was dipped into respective solutions of neutral prepolymer condensate of Example 1 for 10 minutes then pressed between paper towels to soak up excess resin and cured for 45 minutes at 110° C. The paper without a coating gave a limited oxygen index of 18 while the examples gave the following limited oxygen index. The terms "initial weight" and "final weight" used below refer to kraft paper weighed without and with polymer, respectively.

| Example | Initial Weight | LOI | Final Weight |
|---|---|---|---|
| a | 0.36 | 40.5 | 1.00 |
| b | 0.35 | 40.5 | 0.96 |
| c | 0.35 | Less than 20 | 0.90 |

EXAMPLE 22

Burnthrough fire testing was conducted on glass fiber fabrics coated with the coating of Example 1 having titanium oxide filler in an amount of 40 percent. The fabrics were two-ply chopped strand mat, needled mat and a combination of chopped strand mat and continuous strand mat. The pickup of the coating on the mats were respectively 20 percent, 16 percent and 16 percent. The burnthrough times for all the mats were greater than 9 minutes.

EXAMPLE 23

In addition, various coated glass fiber mats were tested for fire resistant roofing underlayment. The mats were used in conjunction with aluminum cedar shakes and tested according to the Underwriters Laboratory UL-790 Burning Brand Test. The mole ratio were prepared by saturation with an aqueous slurry of Composition A having: curable polymeric reaction product from Example 1 with $TiO_2$ in a ratio of 1:1, or Composition B having aqueous curable polymeric reaction product from Example 1, (24%), Resimene 841 melamine formaldehyde (35%), Wallostonite (24%) and Hi-Sil silica (17%).

Excess slurry was removed by squeeze rollers and the mat was molded into the backside of an aluminum substrate and oven cured. The results are shown in Table 6.

TABLE 6

| Identification | Composition | Add On | Test Conducted | Results |
|---|---|---|---|---|
| 1.5 oz mat | A | 34% | B | Passed |

TABLE 6-continued

| Identification | Composition | Add On | Test Conducted | Results |
|---|---|---|---|---|
| 2.0 oz mat | A | 34% | B | Passed |
| " | " | " | " | Passed |
| Two plies of 20 oz mat | A | 34% each | A | Failed after 20 minutes |
| Two plies of 2 oz and 3 oz mat | A | 34% & 60% | A | Failed after 20 minutes |
| Two plies of 2 oz mat | B | 150% | A | Failed after 20 minutes |
| Composition A | PR-66 | 60% | Titanium dioxide 40% | |
| Composition B | PR-66 | 40% | Resimene 841 (35%), Wallostonite (24%) and Hi-sil (19%) | |

EXAMPLE 23

Six fiberboard samples were coated with the aqueous solution of curable polymeric reaction product of Example 1 with the presence of urea curing agent. The dimensions of the fiberboard samples were fifteen (15) inches wide by four (4) inches long and a thickness of 0.110 inch. At first, the coating was applied by a synthetic mohair roller which left some hair on the surface. Subsequently on remaining samples, a foam rubber roller was used to apply the coating, and this gave good results. The amount of coating applied was 20 grams/sq. ft. at 80 weight percent solids for the Example 1 solution. The coatings were cured on the boards by heating the boards in an oven at 130° C. for 1 hour. These samples were tested in a Steiner tunner test where the tunnel was eight feet long. With this length of tunnel, a 60 flame spreay rating corresponds to a 25 flame spread for the 24 foot tunnel test.

The conditions for the test were:

| | | |
|---|---|---|
| Room temperature | 72° F. | |
| Relative humidity | 47% | |
| Draft pressure | 0.04 | |
| Gas pressure | 3 | |
| Gas | Methane | |
| Conditioning | 24 hours | |
| Preheat temperature | 130° F. | |
| Insertion temperature | 120° F. | |
| Starting temperature | 110° F. | |
| Shutter height | 3 feet | |
| Orifice | 7/32" | |
| Draft lever | ½ | |

| Sample | Flame Spread | Smoke Density | Maximum Tunnel Temperature |
|---|---|---|---|
| 1 | 50.6 | Uncalculable[1] | 320° F. |
| 2 | 37 | " | 330° F. |

[1]Extreme density made density uncalculable.

We claim:

1. A curable resinous solution for forming a flame retardant coating, comprising:
an interaction polymer of:
(A) methylol-containing quaternary phosphonium compound having radicals selected from the group consisting of methylol and hydroxyl or a mixture thereof,
(B) divalent, nitrogen-containing compound having at least 2 active radicals selected from the group consisting of: hydrogen and methylol groups and mixtures thereof wherein said radicals are affiliated with a trivalent nitrogen, and
(C) heteroatom-containing compound capable of reaction with radicals selected from the group consisting of methylol and hydroxyl, wherein the mole ratio of the components is 1:1.5 to around 5 for Component A to Component B and around 1:0.5 to around 4 for Component A to Component C.

2. Curable resinous solution of claim 1 having water.

3. Curable resinous solution of claim 1 having a curing agent.

4. Curable resinous solution of claim 1, wherein the three components, A, B, and C are reacted directly to obtain the polymer.

5. Curable resinous solution of claim 1, wherein the phosphonium compound is condensed with the divalent nitrogen-containing compound at an effective pH to form a prepolymer and the heteroatom-containing compound is reacted with the prepolymer.

6. Curable resinous solution of claim 5, wherein the pH is in the range of around 5 to around 7.

7. A flame retardant coating formed by drying the resinous solution of claim 2.

8. Curable resinous solution of claim 1 having a tertiary amine.

9. Curable resinous solution of claim 1 having an ammonium phosphate catalyst.

10. Curable resinous solution of claim 1, wherein the heteroatom-containing compound is a phosphorus acid compound.

11. A flame retardant coating of claim 7 present on a substrate selected from the group consisting of hydroxyl-containing surfaces and inorganic oxide-containing surfaces.

12. A curable resinous solution for forming a flame retardant coating, comprising:
(A) methylol-containing quaternary phosphonium compound having radicals selected from the group consisting of methylol and hydroxyl or a mixture thereof,
(B) divalent nitrogen-containing compound having at least 2 active radicals selected from the group consisting of: urea, urea derivatives, methylol urea, melamine, urea derivatives, dicyandiamide and cyanamide, and
(C) phosphoric acid compound capable of reaction with radicals selected from the group consisting of methylol and hydroxyl groups and mxitures thereof, wherein the mole ratio of the components is for compoentn A to component B 1:1.5 to around 5, for component A to component C around 1:0.5 to around 4,
(D) water in an effective amount to give a total solids content up to around 95 weight percent,
(E) at least one tertiary amine in an effective amount to yield a pH to retard the formation of formaldehyde, and
(F) curing agent selected from the component B to give an overall ratio of component A to component B and component F in the range of around 1:around 1.8 to around 2.

13. Curable resinous solution of claim 12, wherein components A, B, and D and E are contacted to form a polymer condensate of components A and B, and component C is contacted with the prepolymer.

14. Curable resinous soluton of claim 12 having a pH in the range of around 5 to around 7.

15. A flame retardant coating formed by drying the resinous solution of claim 13.

16. A curable flame retardant coating having the formula:

wherein n is an integer from 1 to around 3 and R represents H.

Figure 1:
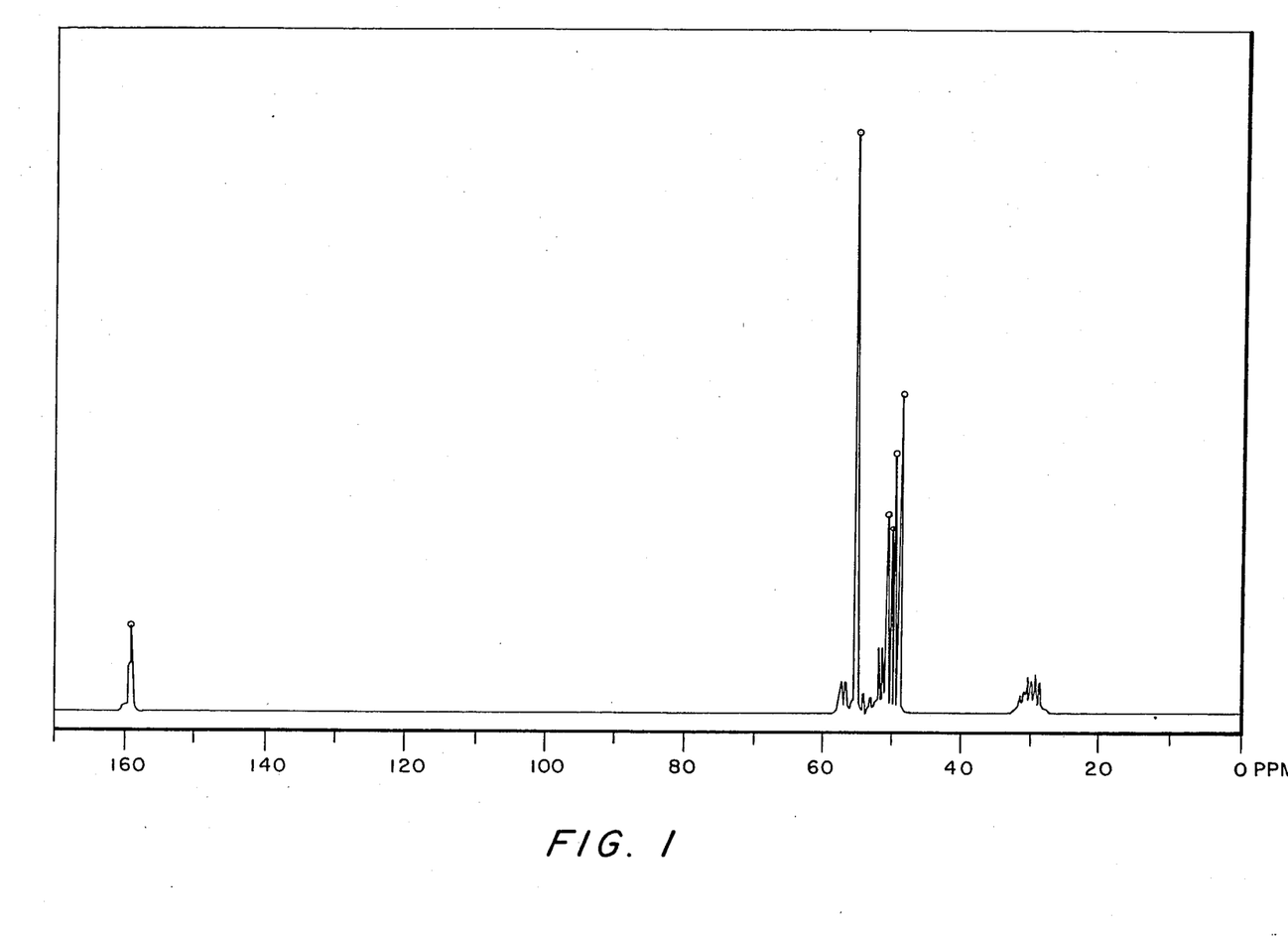
FIGS. 1 and 1a are NMR Carbon 13 and Phosphorus 31 spectra, respectively, of the polymeric reaction product of quaternary phosphonium compound, and urea prepolymer of Example 1.
Figure 1A:
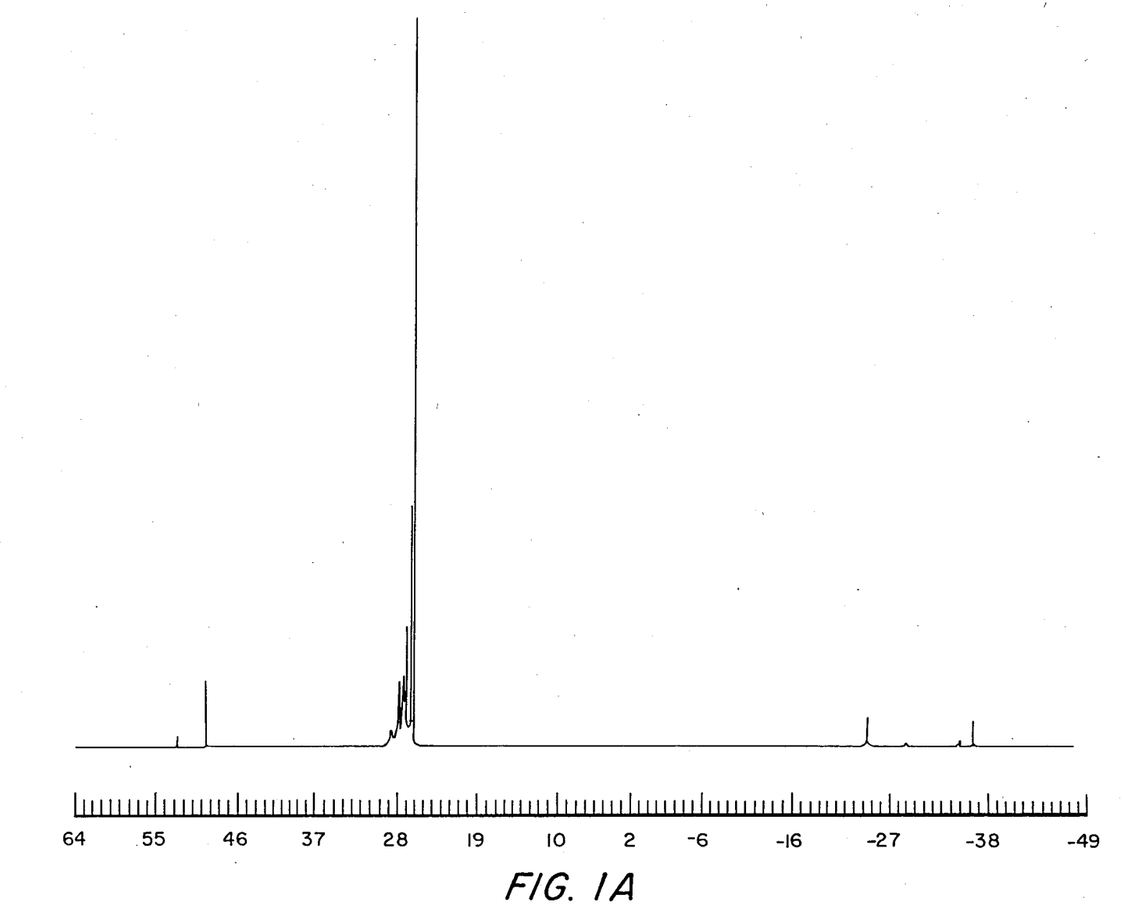
Figure 2:
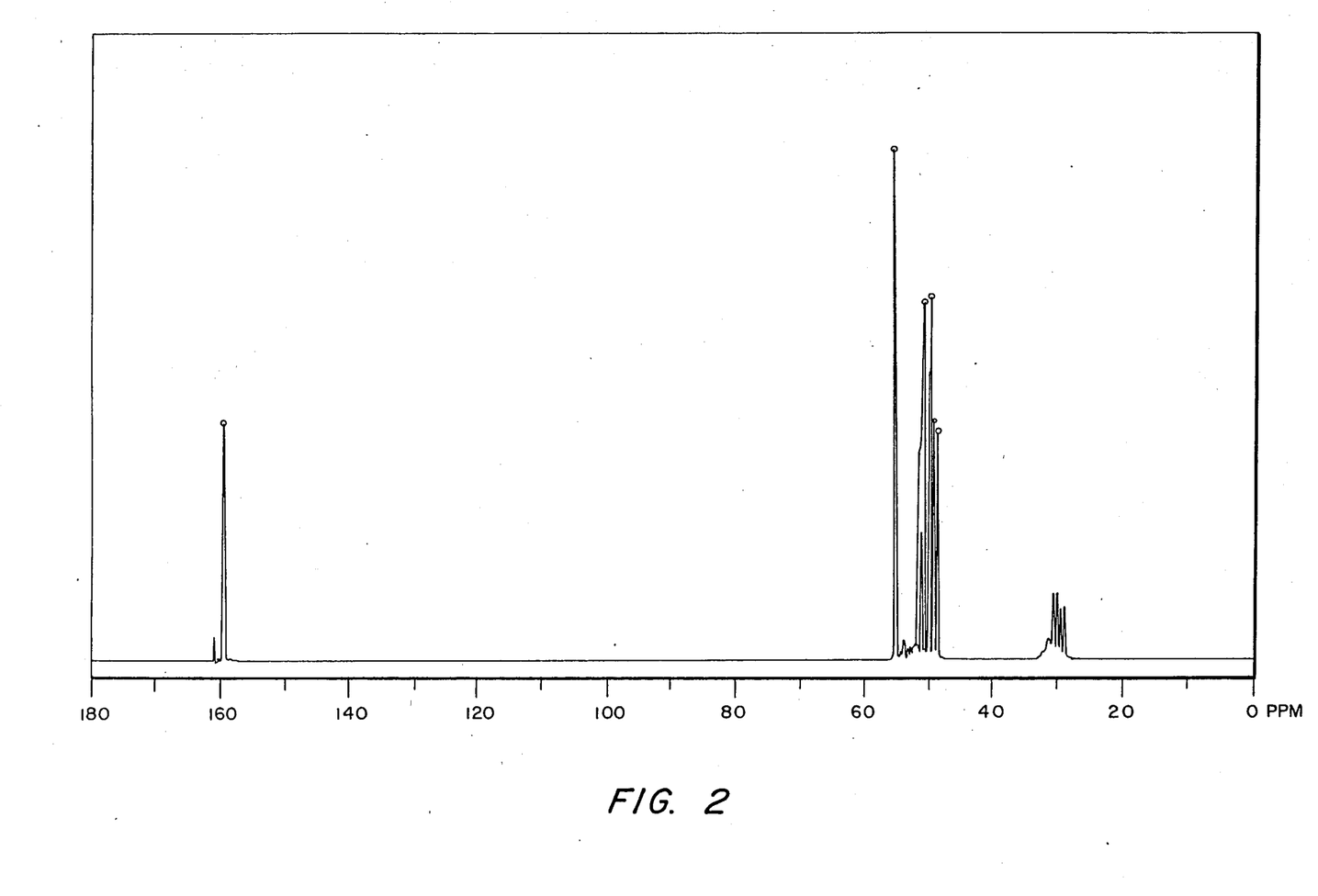
FIGS. 2 and 2b are the Carbon 13 and Phosphorus 31 NMR spectra, respectively, of the curable polymeric reaction product of Example 1.
Figure 2B:
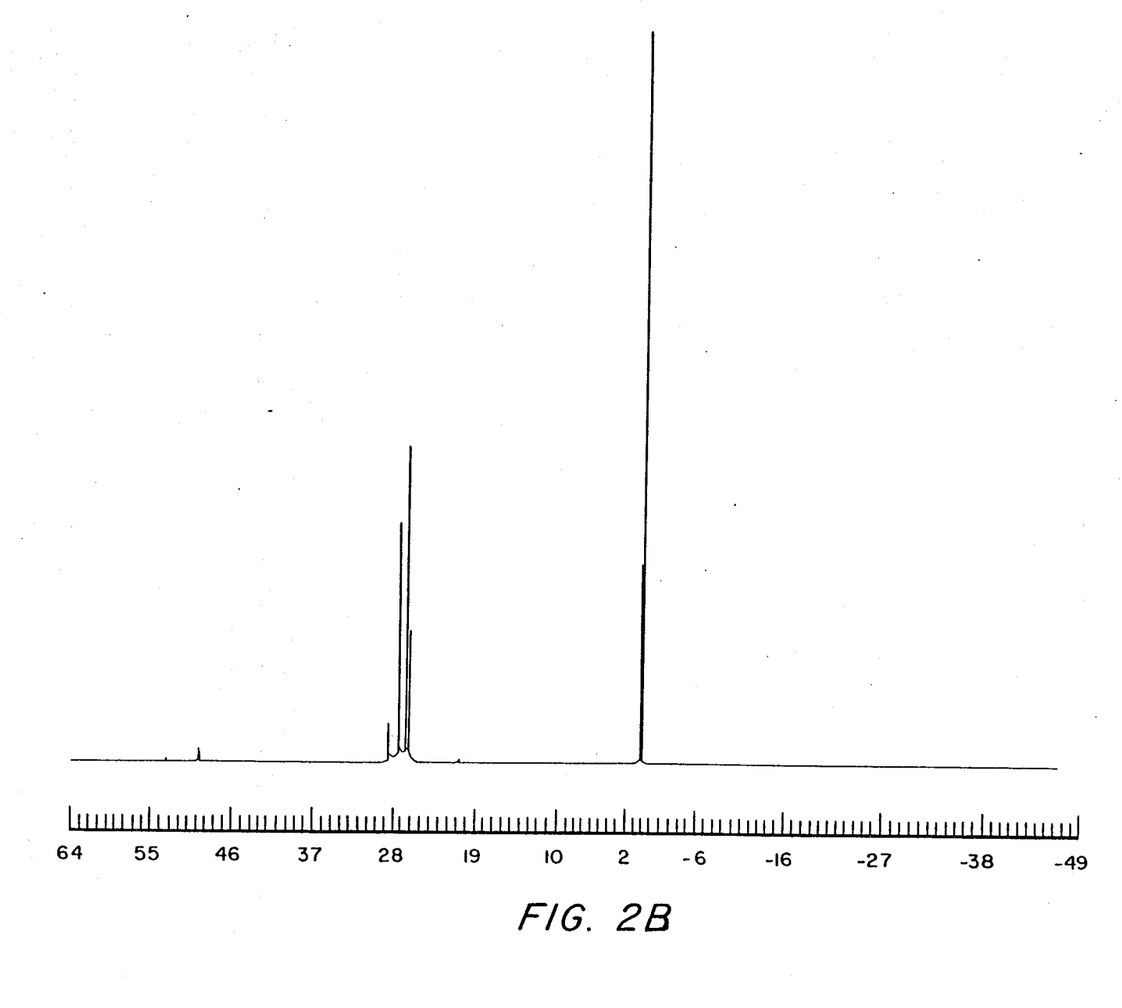

17. A curable flame retardnt coating having the NMR and IR spectra of FIGS. 2 and 2a.

18. Method of preparing curable resinous solution for forming a flame retardant coating, comprising:
reacting a methylol-containing quaternary phosphonium compound having radicals selected from the group consisting of methylol and hydroxyl or mixtures thereof with a divalent nitrogen-containing compound having at least 2 active radicals selected from the group consisting of hydrogen and methylol groups and mixtures thereof, wherein said radicals are affiliated with a trivalent nitrogen in the presence of a tertiary amine for effective pH control and in the presence of a heteroatom-containing acid to stabilize the solution.

19. Method of claim 18, wherein the phosphonium compound and nitrogen-containing compound are reacted in the presence of tertiary amine in a ratio of around 1:1.8 to 2 to form a prepolymer, and reacting the prepolymer with the heteroatom-containing compound in a mole ratio of around 1:0.5 to 4.

* * * * *

UNITED STATES PATENT AND TRADEMARK OFFICE
CERTIFICATE OF CORRECTION

PATENT NO. : 4,806,620

DATED : February 21, 1989

INVENTOR(S) : Michael W. Klett et al

It is certified that error appears in the above-identified patent and that said Letters Patent is hereby corrected as shown below:

Column 16, line 46, the term "mxitures" should read --mixtures--;

Column 16, line 48, the term "compoentn" should read --component--.

Signed and Sealed this

Twenty-seventh Day of November, 1990

Attest:

HARRY F. MANBECK, JR.

*Attesting Officer*  *Commissioner of Patents and Trademarks*